(12) United States Patent
Mac Farland

(10) Patent No.: US 6,439,642 B2
(45) Date of Patent: Aug. 27, 2002

(54) RETRACTABLE HARD TOP FOR PASSENGER CARS

(75) Inventor: David Mac Farland, UnterschleiBheim (DE)

(73) Assignee: Dura Convertable GmbH (DE)

( * ) Notice: Subject to any disclaimer, the term of this patent is extended or adjusted under 35 U.S.C. 154(b) by 0 days.

(21) Appl. No.: 09/837,157

(22) Filed: Apr. 17, 2001

Related U.S. Application Data

(63) Continuation-in-part of application No. 09/316,592, filed on May 21, 1999, now abandoned.

(51) Int. Cl.7 .................................................. B60J 7/14
(52) U.S. Cl. ............. 296/108; 296/107.15; 296/107.17
(58) Field of Search ............... 296/108, 107.15–107.18, 296/116, 117

(56) References Cited

U.S. PATENT DOCUMENTS 5,833,300 A * 11/1998 Russke ....................... 296/108
6,312,042 B1 * 11/2001 Halbweiss et al. .......... 296/108
6,343,829 B2 * 2/2002 Busch ............... 296/107.16 X

* cited by examiner

Primary Examiner—Dennis H. Pedder
(74) Attorney, Agent, or Firm—Gardner Carton & Douglas

(57) ABSTRACT

Disclosed is a retractable hard top for passenger cars, comprising: a first substantially rigid roof section, which forms an essentially horizontal upper roof portion of the passenger car; a second substantially rigid rear roof section which forms a substantially vertical or obliquely extending roof portion which is of hollowed shape, thereby forming an inner space, wherein the rear roof section at an upper end is pivotally connected to the first roof section via a rod assembly at both longitudinal sides of the passenger car and at a lower end is pivotally connected to the passenger car at a support at both sides of the passenger car; pivotally arranged guiding rods that link the rod assemblies and the supports of the passenger car, wherein the rod assembly and the guiding rod are formed and connected in a manner that, when an upper end of the guiding rods is pivoted towards a tail of the car, the second roof section is pivoted in the direction of the tail of the car, while simultaneously the first roof section is pivoted in the same direction, a rear end of the first roof section is lowered under the level of a front end of the second roof section, and the first roof section is moved into the inner space of the second roof section, until the second roof section is deposited upside down in an accommodation space of the car and the first roof section is deposited upside down into the inner space of the second roof section; wherein the first roof section comprises two slots extending longitudinally from the rear end at both sides of the first roof section, and wherein the rod assemblies move through the slots when the first roof section is pivoted.

10 Claims, 6 Drawing Sheets

RETRACTABLE HARD TOP FOR PASSENGER CARS

This application is a continuation-in-part of Ser. No. 09/316,592 filed May 21, 1999 now abandoned.

FIELD OF THE INVENTION

This invention relates to a retractable hard top for passenger cars comprising two roof sections that can be lowered in an accommodation space in the tail of a passenger car, and to a passenger car with this hard top.

SCOPE OF THE PRIOR ART

Originally, starting with carriages, engine-driven vehicles were first constructed in an open manner, and had only partial roofs. Open driving was and is part of the culture of automobile driving, now more so than ever before. In the case of convertibles, it is primarily folding roofs, which are constructed in such a manner as to be able to be retracted and stretched out again, with a structure of bars and an external skin which is correspondingly foldable. Such types of folding roofs have disadvantages, particularly for reason of restricted suitability during bad weather and winter and are, because of their construction, adversely affected by unpleasant wind noises at high speeds.

For an increased suitability during bad weather and winter, rigid convertible folding tops, so-called hard tops, which were designed in an extremely expensive and detachable manner and, in particular, also had the same expensive paintwork as the rest of the vehicle, had been developed many years ago.

Because of tendencies within the culture of motor vehicles at the present time, convertibles are no longer purely used as leisure-time vehicles, and thus as the second or third cars of a household, for example, but instead function as the primary or year-round vehicle.

Proposals for hard tops which can be retracted into the vehicle are additionally known from the current state of the art. A divisible hard top which is formed from a first roof section, which extends essentially from the "A" column to the "C" column of the car, and which has a second roof section which essentially forms the "C" column and encloses the passenger space above the rear section of the motor vehicle, is already known from U.S. Pat. No. 4,729, 592A1, for example. Both roof sections can be moved independently of one another whereby, in particular, the first roof section can be moved into the second roof section.

A divided hard top is likewise known from EP-A1-764 553, in which the first roof section is completely moved into the second roof section, after which the second roof section is retracted into the vehicle by means of swiveling.

In the last mentioned state of the art, it is particularly disadvantageous that, in addition to a moving and swiveling mechanism, which is extremely expensive in constructional terms, a restriction of the head room is brought about because of the retraction of the forward roof section under the rear roof section, so that either the entire hard top must be constructed to be considerably higher, so that construction must thereby be carried out in a manner contrary to the requirements for a sporty convertible, or else, on the other hand, the occupants must exit the vehicle if the hard top has to be retracted into the vehicle.

SUMMARY OF THE INVENTION

Therefore, the main object of this invention is to provide a retractable hard top for passenger cars, which has a simple construction and which, by means of simple kinematics and with the maintenance of the necessary head clearance, makes possible a complete retraction of the hard top into the car.

This object is solved by the features of claim 1.

Accordingly, the present invention provides a retractable hard top for passenger cars, comprising a first substantially rigid roof section, which forms an essentially horizontal upper roof portion of the passenger car; a second substantially rigid rear roof section which forms a substantially vertical or obliquely extending roof portion which is of hollowed shape, thereby forming an inner space, wherein the rear roof section at an upper end is pivotally connected to the first roof section via a rod assembly at both longitudinal sides of the passenger car and at a lower end is pivotally connected to the passenger car at a support at both sides of the passenger car; pivotally arranged guiding rods that link the rod assemblies and the supports of the passenger car, wherein the rod assembly and the guiding rod are formed and connected in a manner that, when an upper end of the guiding rods is pivoted towards a tail of the car, the second roof section is pivoted in the direction of the tail of the car, and simultaneously the first roof section is pivoted in the same direction, a rear end of the first roof section is lowered under the level of a front end of the second roof section, and the first roof section is moved into the inner space of the second roof section, until the second roof section is deposited upside down in an accommodation space of the car and the first roof section is deposited upside down into the inner space of the second roof section. The first roof section comprises two slots extending longitudinally from the rear end at both sides of the first roof section, wherein the rod assemblies move through the slots when the first roof section is pivoted. Due to the pivotal movement of the first roof section into the second roof section during the swiveling movement of the second roof section a complete retraction of the hard top into the car is possible, with the maintenance of enough head clearance for the occupants of the car.

Furthermore, it is achieved that the space for the lowered hard top can be significantly reduced and the components of the passenger car, such as the fuel tank, can be dimensioned sufficiently large.

As usual, the retractable hard top according to the invention comprises an axially symmetrical structure regarding the longitudinal axis of the passenger car. The arrangement of the rod assembly is carried out at the longitudinal side portions and is made symmetrical with respect to the longitudinal axis of the passenger car.

Advantageously the rod assembly of the first and second roof section comprises for each longitudinal side of the passenger car an essentially straight and an essentially curved or bent, pivotally arranged connection rod. By means of the total of four connection rods, two for each side of the car, an especially simple mechanism for folding or extracting the first roof section with respect to the second rear roof section is provided.

Further details, features and advantages of the invention will become readily apparent from the following description and the accompanying drawings.

DETAILED DESCRIPTION OF THE PREFERRED EMBODIMENT

Now the retractable hard top and the passenger car equipped with this hard top according to the invention will be described closer. In the Figures the same elements are designated by the same reference numbers.

Figure 1:
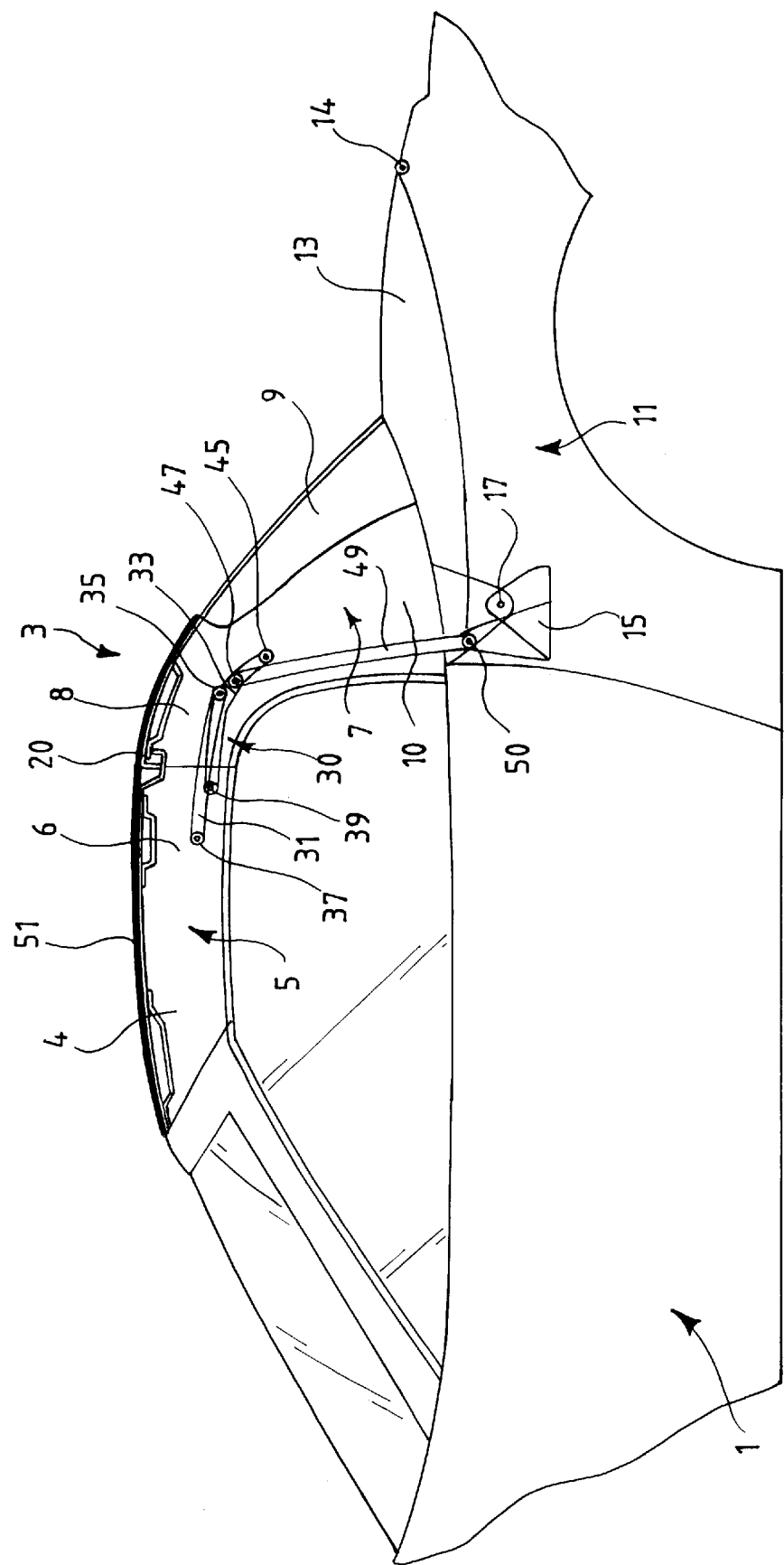
FIG. 1 shows a schematic lateral view of a convertible equipped with a retractable hard top according to the invention in closed position.

FIG. 1 schematically shows in a side view a passenger car 1 in the form of a convertible. The passenger car 1 comprises a retractable hard top 3, which is in closed position. The retractable hard top 3 comprises a first horizontal, substantially rigid, roof section 5 and a second substantially vertical or obliquely extending rigid rear roof section 7 which are contiguous with each other. The space between the two sections is sealed by conventional sealing means 20, which are not described in more detail. A rear window 9 is arranged in the rear roof section 7, said window being formed as a rigid pane, in particular made of glass. The first roof section is of a curved cap-like shape, and the larger second roof section is of hollowed shape, thereby forming an inner space. The two roof sections are linked via a rod assembly 30 at both longitudinal sides of the passenger car, which will be described in more detail later.

The passenger car 1 further comprises an accommodation space 11 for the hard top 3 and a cover 13 that is pivotally connected at the passenger car around an axis 14 and is in sealing cover position in FIG. 1.

The retractable hard top 3 is connected to the passenger car 1 via a support plate 15. The rear roof section 7 is at its lower end 10 supported pivotally around an axis 17 to the support plate 15 at the rear and outer one of two curved tongue portions of the support plate 15. As an alternative, it may also be directly connected to the passenger car.

The retractable hard top 3 according to the invention comprises a flexible outer cover 51, e.g. made of a textile tissue, such as a cloth, which is connected to the first front roof section 5 in its front portion 4 and to the second roof section 7 on all areas around the rear window 9. This provides the advantage that the first and second roof sections can be made of a plastic member, in which special surface treatments, in particular a coat of lacquer, are not required. Thus, the entire hard top can be formed in an inexpensive manner.

Figure 2:
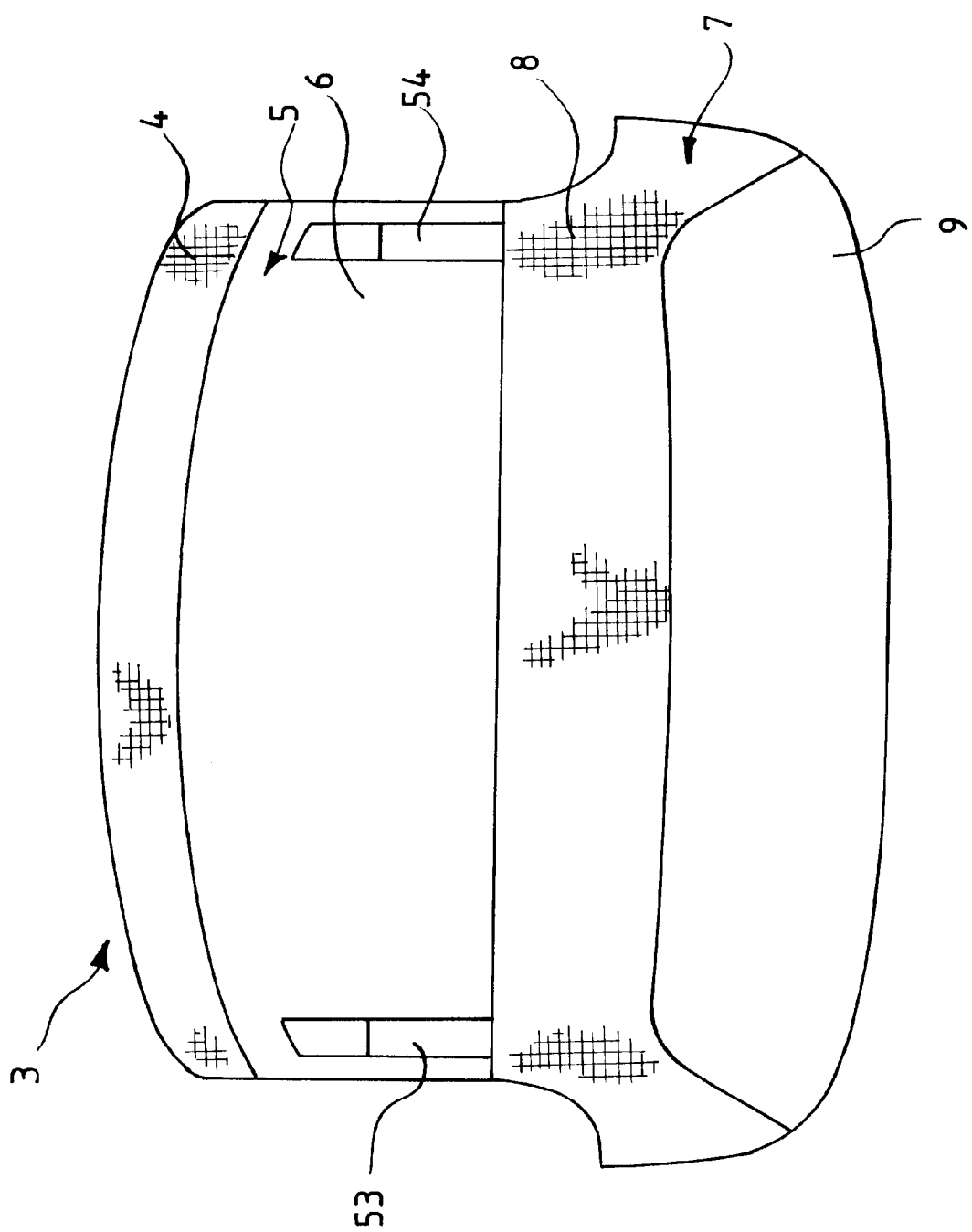
FIG. 2 shows a top view onto the first and second roof section of the hard top of FIG. 1.

FIG. 2 diagrammatically shows a top view onto the closed top 3 according to FIG. 1 without the outer cover 51. The portions with crossed lining correspond to the connection portions of the outer cover 51 with the rear roof section 7 or the first roof section 5. It can further be seen that slots 53 and 54 are formed from the rear end 6 along the two longitudinal sides of the first roof section 5. During the pivotal movement of the first roof section the rod assemblies 30 extend through these slots, as will easily be understood from the view of the positions according to FIGS. 3 to 6.

Now, the structure of the retractable hard top 3 and its opening mechanism will in particular be described in more detail with reference to FIGS. 3 to 6.

The rod structure is substantially arranged in both longitudinal side ranges of the passenger car, but FIG. 3 to 6 only schematically show one side of the rod structure of the hard top 3 according to the invention, while the other side of the rod structure formed symmetrical thereto on the other longitudinal side of the passenger car is not shown.

Figure 3:
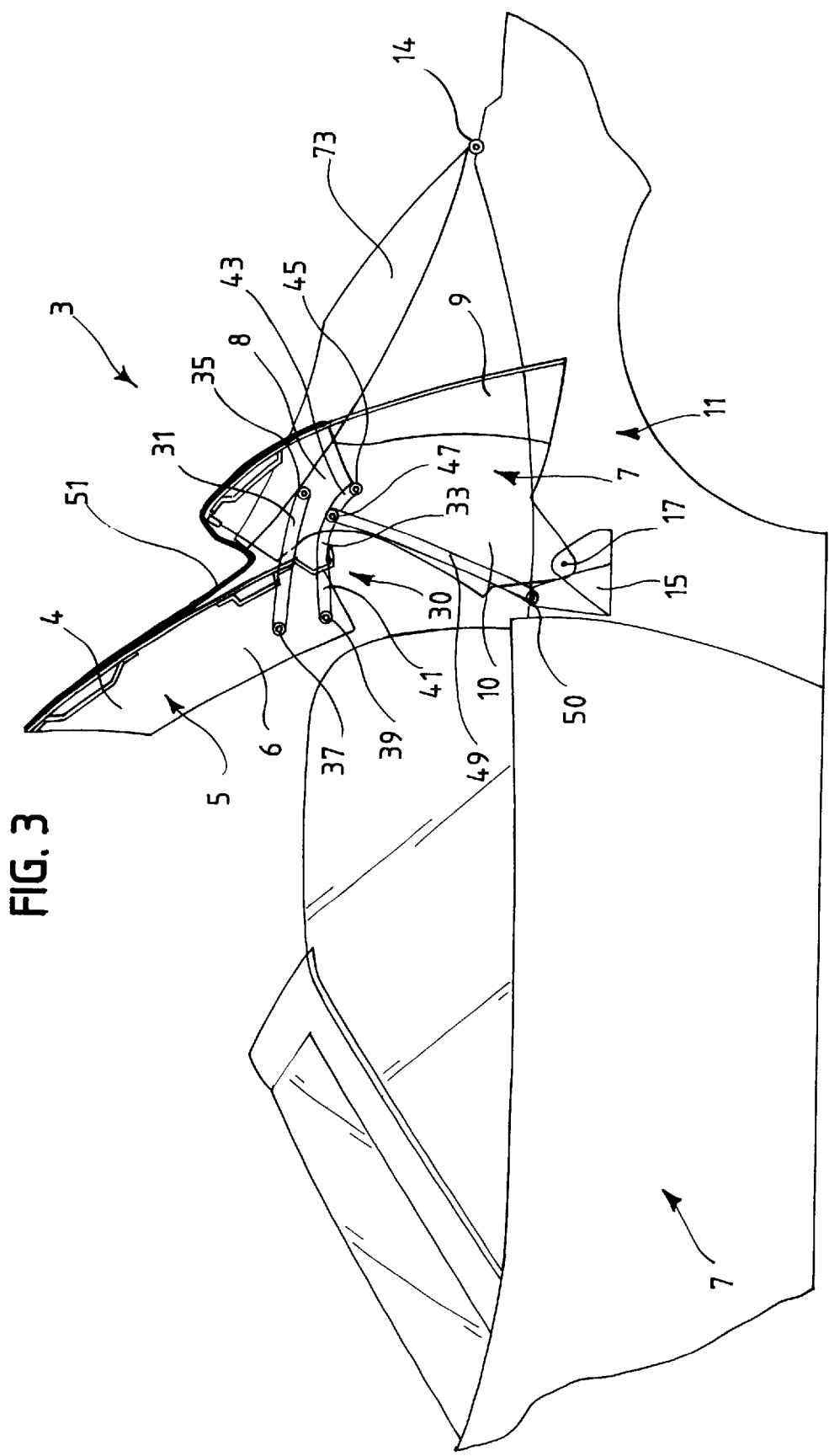
FIGS. 3 to 6 show schematic lateral views of a convertible with the hard top in successive stages of its opening process.
Figure 4:
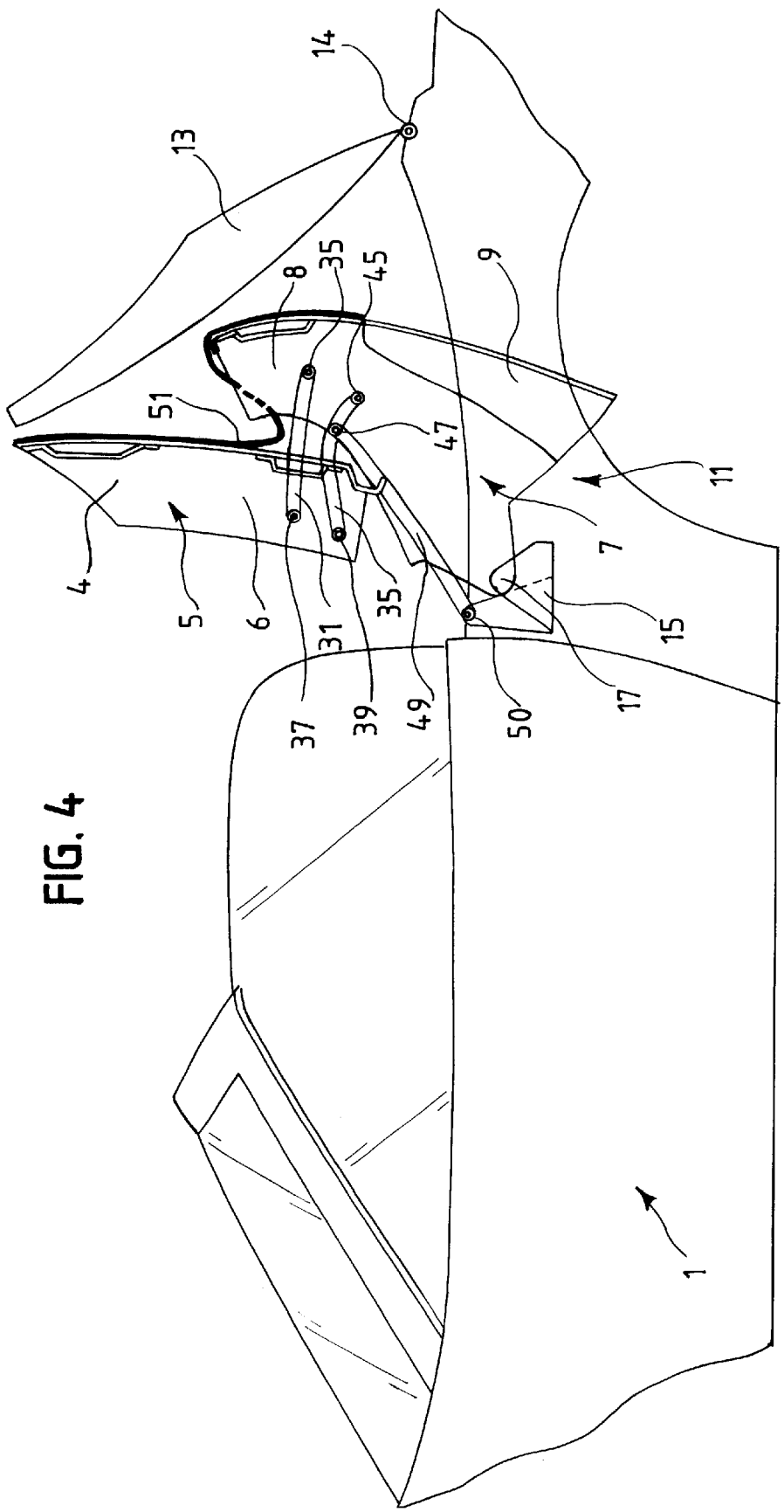
Figure 5:
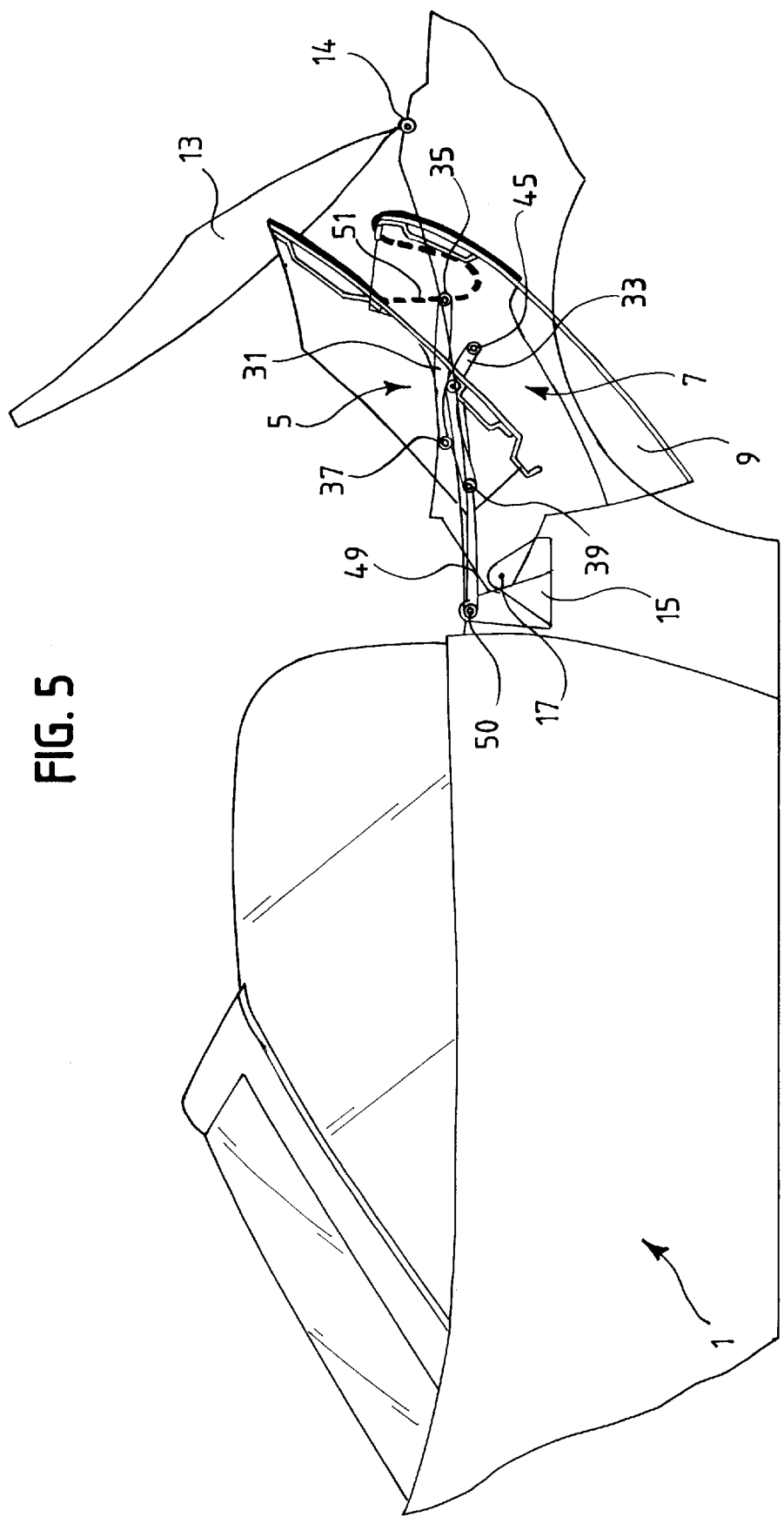
Figure 6:
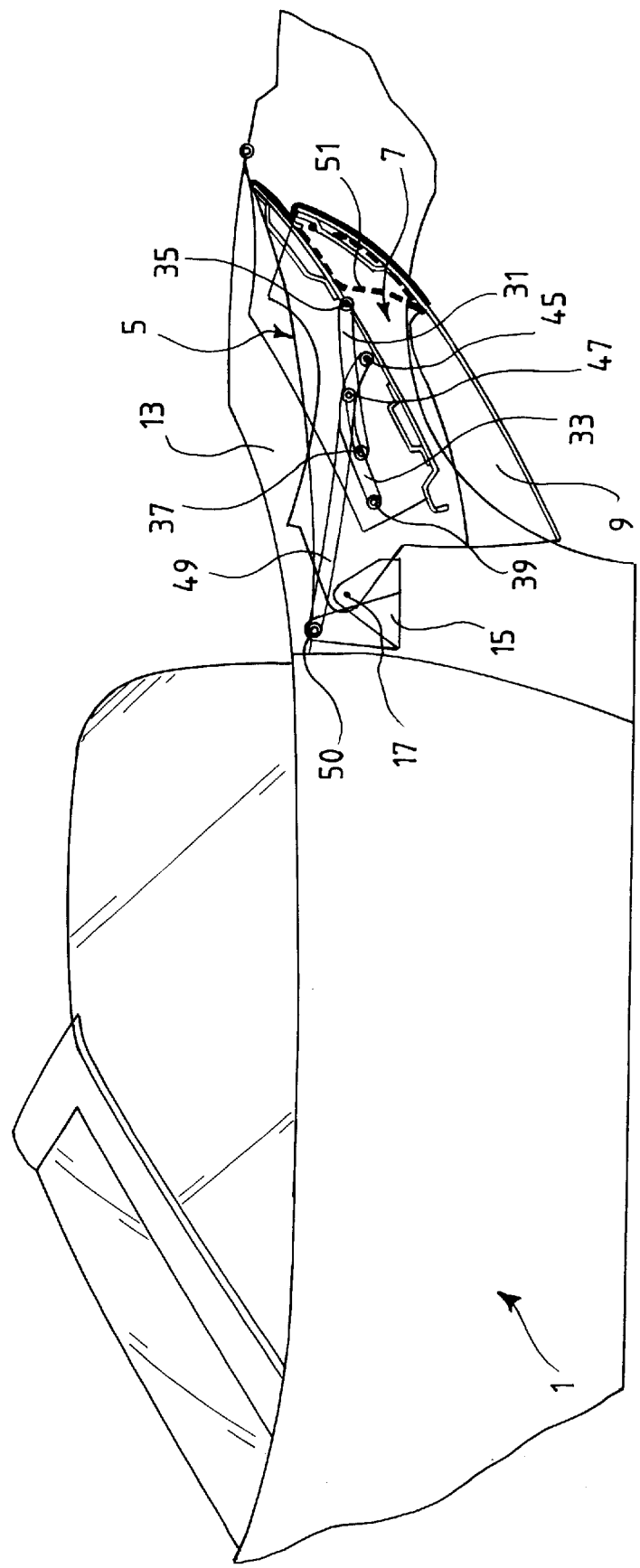

FIG. 3 shows a first position of the convertible hard top 3 after the opening process has started. First of all, the cover 13 is pivoted upwardly around axis 14 so that the access to the accommodation space 11 is free.

As may clearly be seen from FIG. 3, the first roof section 5 is connected at each longitudinal side of the passenger car to the rear roof section 7 via a rod assembly 30 comprising two connection rods, namely a substantially straight connection rod 31 and a curved or bent connection rod 33. The straight connection rod 31 is located above the curved connection rod 33 and is connected to the rear second roof section 7 at hinge point 35. At its other end, the straight connection rod 31 is pivotally connected to the first roof section 5 at hinge point 37.

The curved connection rod 33 comprises two curved sections 41 and 43, wherein section 41 is a longer front section and section 43 is a shorter rear section. The rear section 43 is at its rear end pivotally connected to the second roof section 7 at hinge point 45, and the front section 41 is at its front end pivotally connected to the first roof section 5 in hinge point 39. In closed position of the hard top, hinge point 37 is in front of hinge point 39 and hinge point 35 is in front of hinge point 45.

The rod assembly 30 is linked to the passenger car via a guiding rod 49 that is at its lower end pivotally connected to the first and inner tongue of support plate 15 in hinge point 50. At its upper end guiding rod 49 is pivotally connected with connection rod 33 in a hinged connection point 47 between the two sections 41 and 43.

To initiate the opening mechanism, the upper end of the guiding rods 49 is pivoted towards the tail of the car around hinge point 50 by means of a conventional driven motor known from the state of the art, and the second roof section 7 is pivoted in the direction of the tail of the car around swiveling axis 17. By means of this movement and the geometrical construction of the rod mechanism, the first roof section 5 is pivoted in the same direction around a moving swiveling axis in the area of hinge points 37 and 39, and the rear end 6 of the first roof section 5 is lowered under the level of the front end 8 of the second roof section 7. Thereby the outer cover 51 which is not fixed to the rear portion 6 of first roof section 5 loses contact with the rear portion 6 in a rolling movement and sags between the front portion 4 of first roof section 5 and the front portion 8 of second roof section 7. When the second roof section 7 is pivoted farther backwards, the first roof section 5 is moved into the inner hollow space of the second roof section 7, wherein the connection rods 31 and 33 go through the slots 53 and 54 in the first roof section 5. Then the second roof section 7 is deposited upside down in the accommodation space 11, and the first roof section 5 is deposited upside down into the inner space of the second roof section 7. Finally, the cover 13 is pivoted around axis 14 to close the accommodation space 11.

Therefore, in the final position the first roof section 5 is arranged completely within the rear roof section 7 and leaves a corresponding space for further elements of the passenger car, e.g. for the fuel tank.

The corresponding closing procedure of the hard top provides movement of the involved parts in reverse sequence.

The present invention therefore provides in an excellent manner a retractable hard top, which can be folded into the accommodation space of a passenger car in an especially space-saving manner by means of a reliable mechanical construction.

Of course, various changes and modifications of the preferred embodiment described will be apparent to one skilled in the art. Such changes can be made without departing from the spirit and scope of the invention and without diminishing its attendant advantages. It is therefore intended that such changes and modifications be covered by the appended claims.

What is claimed is:

1. A retractable hard top for passenger cars, comprising:

a first substantially rigid roof section, which forms an essentially horizontal upper roof portion of the passenger car;

a second substantially rigid rear roof section which forms a substantially vertical or obliquely extending roof portion which is of a hollowed shape, thereby forming an inner space, wherein the second rear roof section at an upper end is pivotally connected to the first roof section via a rod assembly on each longitudinal side of the passenger car and at a lower end for pivotal connection to each longitudinal side of the passenger car via a support;

a pivotally arranged guiding rod that links the rod assembly and the support on each longitudinal side of the hard top, wherein each rod assembly and each guiding rod are formed and connected in a manner that, when an upper end of each guiding rod is pivoted towards a tail of the car, the second roof section is pivoted in the direction of the tail of the car, and simultaneously the first roof section is pivoted in the same direction, a rear end of the first roof section is lowered under a front end of the second roof section, and the first roof section is moved into the inner space of the second roof section, until the second roof section is deposited upside down and the first roof section is deposited upside down into the inner space of the second roof section; and wherein the first roof section comprises two slots extending longitudinally from the rear end at each side of the first roof section, and wherein each rod assembly moves through the slots when the first roof section is pivoted.

2. The retractable hard top as claimed in claim 1, wherein the rod assembly on each longitudinal side of the hard top further comprises an upper, substantially straight connection rod and a lower, curved or bent connection rod.

3. The retractable hard top as claimed in claim 2, wherein with the rigid roof sections upright the straight connection rod is pivotally connected to the second rear roof section at a hinge point which is located above and in front of a hinge point where the curved connection rod is pivotally connected to the second rear roof section.

4. The retractable hard top as claimed in claim 2, wherein with the rigid roof sections upright the straight connection rod is pivotally connected to the first roof section at a hinge point which is arranged in front of a hinged connection point where the curved connection rod is pivotally connected to the first roof section.

5. A passenger car having an accommodation space for a roof cover and a retractable hard top, comprising:

a first substantially rigid roof section, which forms an essentially horizontal upper roof portion of the passenger car;

a second substantially rigid rear roof section which forms a substantially vertical or obliquely extending roof portion which is of a hollowed shape, thereby forming an inner space, wherein the second rear roof section at an upper end is pivotally connected to the first roof section via a rod assembly on each longitudinal side of the passenger car and at a lower end is pivotally connected to each longitudinal side of the passenger car via a support;

a pivotally arranged guiding rod that links the rod assembly and the support on each longitudinal side of the passenger car, wherein the rod assembly and the guiding rod are formed and connected in a manner that, when an upper end of each guiding rod is pivoted towards a tail of the car, the second roof section is pivoted in the direction of the tail of the car, while simultaneously the first roof section is pivoted in the same direction, a rear end of the first roof section is lowered under a front end of the second roof section, and the first roof section is moved into the inner space of the second roof section, until the second roof section is deposited upside down in the accommodation space of the car and the first roof section is deposited upside down into the inner space of the second roof section; and wherein the first roof section comprises two slots extending longitudinally from the rear end at each side of the first roof section, and wherein each rod assembly moves through the slots when the first roof section is pivoted.

6. The passenger car as claimed in claim 5, wherein the rod assembly of the retractable hard top on each longitudinal side of the passenger car further comprises an upper, substantially straight connection rod and a lower, curved or bent connection rod.

7. The passenger car as claimed in claim 6, wherein with the rigid roof sections upright the straight connection rod is pivotally connected to the second rear roof section at a hinge point which is located above and in front of a hinge point where the curved connection rod is pivotally connected to the second rear roof section.

8. The passenger car as claimed in claim 6, wherein with the rigid roof sections upright the straight connection rod is pivotally connected to the first roof section at a hinge point which is arranged in front of a hinged connection point where the curved connection rod is pivotally connected to the first roof section.

9. The retractable hard top as claimed in claim 3, wherein with the rigid roof sections upright the straight connection rod is pivotally connected to the first roof section at a hinge point which is arranged in front of a hinged connection point where the curved connection rod is pivotally connected to the first roof section.

10. The passenger car as claimed in claim 7, wherein with the rigid roof sections upright the straight connection rod is pivotally connected to the first roof section at a hinge point which is arranged in front of a hinged connection point where the curved connection rod is pivotally connected to the first roof section.

* * * * *